US 9,047,196 B2

(12) United States Patent
Gounares

(10) Patent No.: US 9,047,196 B2
(45) Date of Patent: Jun. 2, 2015

(54) USAGE AWARE NUMA PROCESS SCHEDULING

(75) Inventor: Alexander G. Gounares, Kirkland, WA (US)

(73) Assignee: Concurix Corporation, Kirkland, WA (US)

(*) Notice: Subject to any disclaimer, the term of this patent is extended or adjusted under 35 U.S.C. 154(b) by 62 days.

(21) Appl. No.: 13/526,729

(22) Filed: Jun. 19, 2012

(65) Prior Publication Data

US 2012/0317371 A1    Dec. 13, 2012

(51) Int. Cl.
*G06F 12/02*    (2006.01)
*G06F 12/08*    (2006.01)

(52) U.S. Cl.
CPC ........ *G06F 12/0813* (2013.01); *G06F 12/0817* (2013.01)

(58) Field of Classification Search
CPC .... G06F 15/167; G06F 9/3885; G06F 9/3889
See application file for complete search history.

(56) References Cited

U.S. PATENT DOCUMENTS

| 3,643,227 | A |   | 2/1972  | Smith et al.            |
|-----------|---|---|---------|-------------------------|
| 4,631,674 | A |   | 12/1986 | Blandy                  |
| 4,961,137 | A | * | 10/1990 | Augusteijn et al. ....... 1/1 |
| 5,506,987 | A |   | 4/1996  | Abramson et al.         |
| 5,581,765 | A | * | 12/1996 | Munroe et al. ........ 718/107 |
| 5,838,365 | A | * | 11/1998 | Sawasaki et al. ......... 348/169 |
| 5,900,001 | A |   | 5/1999  | Wolczko et al.          |
| 5,903,900 | A |   | 5/1999  | Knippel et al.          |
| 6,006,235 | A |   | 12/1999 | Macdonald et al.        |
| 6,038,572 | A |   | 3/2000  | Schwartz et al.         |
| 6,047,295 | A |   | 4/2000  | Endicott et al.         |
| 6,061,281 | A | * | 5/2000  | Nagata ............ 365/200 |
| 6,098,080 | A |   | 8/2000  | Endicott et al.         |
| 6,104,962 | A |   | 8/2000  | Sastry                  |
| 6,128,642 | A |   | 10/2000 | Doraswamy et al.        |
| 6,230,183 | B1|   | 5/2001  | Yocom et al.            |
| 6,289,360 | B1|   | 9/2001  | Kolodner et al.         |
| 6,308,319 | B1|   | 10/2001 | Bush et al.             |
| 6,317,756 | B1|   | 11/2001 | Kolodner et al.         |
| 6,421,704 | B1|   | 7/2002  | Waldo et al.            |
| 6,484,188 | B1|   | 11/2002 | Kwong et al.            |

(Continued)

OTHER PUBLICATIONS

International Searching Authority, Korean Intellectual Property Office, International Search Report and Written Opinion PCT/US2012/063040, May 15, 2013.

(Continued)

*Primary Examiner* — Charles Rones
*Assistant Examiner* — Tian-Pong Chang
(74) *Attorney, Agent, or Firm* — Æ ON Law; Adam L. K. Philipp

(57) ABSTRACT

Processes may be assigned to specific processors when memory objects consumed by the processes are located in memory banks closely associated with the processors. When assigning processes to threads operating in a multiple processor NUMA architecture system, an analysis of the memory objects accessed by a process may identify processor or group of processors that may minimize the memory access time of the process. The selection may take into account the connections between memory banks and processors to identify the shortest communication path between the memory objects and the process. The processes may be pre-identified as functional processes that make little or no changes to memory objects other than information passed to or from the processes.

5 Claims, 5 Drawing Sheets

(56) References Cited

U.S. PATENT DOCUMENTS

| | | |
|---|---|---|
| 6,490,599 B2 | 12/2002 | Kolodner et al. |
| 6,490,612 B1 | 12/2002 | Jones et al. |
| 6,516,461 B1 | 2/2003 | Ichisugi |
| 6,519,615 B1 | 2/2003 | Wollrath et al. |
| 6,542,978 B2 | 4/2003 | Goldstein et al. |
| 6,560,773 B1 | 5/2003 | Alexander, III et al. |
| 6,564,240 B2 | 5/2003 | Waldo et al. |
| 6,598,141 B1 | 7/2003 | Dussud et al. |
| 6,658,449 B1 | 12/2003 | Brenner et al. |
| 6,735,769 B1 | 5/2004 | Brenner et al. |
| 6,738,875 B1 | 5/2004 | Wang |
| 6,748,593 B1 | 6/2004 | Brenner et al. |
| 6,760,736 B2 | 7/2004 | Waldo et al. |
| 6,763,520 B1 | 7/2004 | Seeds |
| 6,823,515 B2 | 11/2004 | Livecchi |
| 6,832,370 B1 | 12/2004 | Srinivasan et al. |
| 6,868,488 B2 | 3/2005 | Garthwaite |
| 6,873,952 B1 | 3/2005 | Bailey et al. |
| 6,912,554 B2 | 6/2005 | Yuasa |
| 6,918,111 B1 | 7/2005 | Damron et al. |
| 6,925,644 B2 | 8/2005 | Waldo et al. |
| 6,954,775 B1 | 10/2005 | Shanklin et al. |
| 6,986,140 B2 | 1/2006 | Brenner et al. |
| 6,993,767 B2 | 1/2006 | Brenner et al. |
| 6,999,979 B2 | 2/2006 | Garthwaite |
| 7,003,760 B1 | 2/2006 | Das |
| 7,016,923 B2 | 3/2006 | Garthwaite et al. |
| 7,031,990 B2 | 4/2006 | Garthwaite |
| 7,035,884 B2 | 4/2006 | Garthwaite |
| 7,058,670 B2 | 6/2006 | Garthwaite |
| 7,062,518 B2 | 6/2006 | Garthwaite |
| 7,062,519 B2 | 6/2006 | Garthwaite |
| 7,069,279 B1 | 6/2006 | Rau et al. |
| 7,069,280 B2 | 6/2006 | Garthwaite |
| 7,069,281 B2 | 6/2006 | Garthwaite |
| 7,076,511 B1 | 7/2006 | Lari et al. |
| 7,092,978 B2 | 8/2006 | Garthwaite |
| 7,096,238 B2 | 8/2006 | Garthwaite |
| 7,136,887 B2 | 11/2006 | Garthwaite et al. |
| 7,143,124 B2 | 11/2006 | Garthwaite |
| 7,188,129 B2 | 3/2007 | Garthwaite |
| 7,209,935 B2 | 4/2007 | Garthwaite |
| 7,225,439 B2 | 5/2007 | Garthwaite |
| 7,228,541 B2 | 6/2007 | Gupton et al. |
| 7,251,815 B2 | 7/2007 | Donovan et al. |
| 7,308,466 B2 | 12/2007 | Houldsworth |
| 7,404,182 B1 | 7/2008 | Garthwaite et al. |
| 7,412,580 B1 | 8/2008 | Garthwaite |
| 7,487,237 B2 | 2/2009 | Lloyd et al. |
| 7,558,935 B1 | 7/2009 | Boucher et al. |
| 7,565,386 B2 | 7/2009 | Joisha |
| 7,565,499 B1 | 7/2009 | Garthwaite |
| 7,599,973 B2 | 10/2009 | Detlefs et al. |
| 7,613,753 B2 | 11/2009 | Cornet et al. |
| 7,640,544 B2 | 12/2009 | Flood et al. |
| 7,752,417 B2 | 7/2010 | Manczak et al. |
| 7,797,670 B2 | 9/2010 | Bumgarner et al. |
| 7,865,707 B2 | 1/2011 | Bittlingmayer et al. |
| 7,890,712 B2 | 2/2011 | Bitner et al. |
| 7,984,083 B2 | 7/2011 | Bacon et al. |
| 7,996,446 B2 | 8/2011 | Bacon et al. |
| 8,015,385 B2 | 9/2011 | Schopp |
| 8,028,277 B2 | 9/2011 | Breitgand et al. |
| 8,055,725 B2 | 11/2011 | Alam et al. |
| 8,108,863 B2 | 1/2012 | Rakvic et al. |
| 8,443,230 B1 * | 5/2013 | James-Roxby et al. ......... 714/11 |
| 8,495,598 B2 | 7/2013 | Gounares et al. |
| 8,595,743 B2 | 11/2013 | Gounares et al. |
| 8,607,018 B2 | 12/2013 | Gounares et al. |
| 8,615,766 B2 | 12/2013 | Gounares |
| 8,650,538 B2 | 2/2014 | Gounares |
| 8,656,134 B2 | 2/2014 | Gounares et al. |
| 8,656,135 B2 | 2/2014 | Gounares et al. |
| 8,656,378 B2 | 2/2014 | Gounares et al. |
| 2001/0018701 A1 | 8/2001 | Livecchi |
| 2001/0049757 A1 * | 12/2001 | Liu ................. 710/33 |
| 2003/0200356 A1 | 10/2003 | Hue |
| 2003/0212731 A1 | 11/2003 | Brenner et al. |
| 2004/0107329 A1 | 6/2004 | Krejsa |
| 2004/0138857 A1 * | 7/2004 | Souza et al. ................. 702/186 |
| 2004/0194104 A1 | 9/2004 | Beresnevichiene et al. |
| 2004/0236922 A1 | 11/2004 | Boucher et al. |
| 2005/0071847 A1 | 3/2005 | Bentley et al. |
| 2005/0144364 A1 | 6/2005 | Tu et al. |
| 2005/0166193 A1 | 7/2005 | Smith et al. |
| 2005/0177836 A1 | 8/2005 | Lari et al. |
| 2005/0188164 A1 | 8/2005 | Ballantyne et al. |
| 2005/0210472 A1 | 9/2005 | Accapadi et al. |
| 2005/0235050 A1 | 10/2005 | Baker |
| 2005/0262324 A1 | 11/2005 | Mathiske |
| 2005/0288939 A1 * | 12/2005 | Peled et al. ....................... 705/1 |
| 2006/0069593 A1 | 3/2006 | Estefania et al. |
| 2006/0242637 A1 | 10/2006 | Betarbet |
| 2006/0294167 A1 | 12/2006 | Borman et al. |
| 2007/0006167 A1 * | 1/2007 | Luk et al. ..................... 717/130 |
| 2007/0088716 A1 | 4/2007 | Brumme et al. |
| 2007/0234313 A1 * | 10/2007 | Teranishi ..................... 717/136 |
| 2007/0234366 A1 * | 10/2007 | Morich et al. ................. 718/104 |
| 2007/0288911 A1 | 12/2007 | Martin et al. |
| 2008/0005719 A1 | 1/2008 | Morris |
| 2008/0126453 A1 | 5/2008 | Cornet et al. |
| 2008/0139191 A1 | 6/2008 | Melnyk et al. |
| 2008/0155090 A1 | 6/2008 | Ruscin et al. |
| 2008/0271032 A1 | 10/2008 | Twaddle |
| 2008/0282028 A1 | 11/2008 | Balakrishnan et al. |
| 2008/0295113 A1 | 11/2008 | Breitgand et al. |
| 2009/0024679 A1 | 1/2009 | Amundsen et al. |
| 2009/0089552 A1 | 4/2009 | Inchingolo et al. |
| 2009/0106506 A1 | 4/2009 | Skerlj et al. |
| 2009/0150613 A1 | 6/2009 | Wang et al. |
| 2009/0276183 A1 | 11/2009 | Kusner et al. |
| 2010/0018701 A1 | 1/2010 | Peter et al. |
| 2010/0153443 A1 | 6/2010 | Gaffga et al. |
| 2010/0211756 A1 | 8/2010 | Kaminski et al. |
| 2010/0235603 A1 | 9/2010 | Ravindranath et al. |
| 2010/0275189 A1 * | 10/2010 | Cooke et al. ................. 717/146 |
| 2010/0293342 A1 * | 11/2010 | Morfey et al. ................. 711/154 |
| 2010/0318630 A1 | 12/2010 | Howell et al. |
| 2010/0333109 A1 | 12/2010 | Milnor |
| 2011/0067030 A1 | 3/2011 | Isard et al. |
| 2011/0087387 A1 | 4/2011 | Safa-Bakhsh et al. |
| 2011/0145609 A1 * | 6/2011 | Berard et al. ................. 713/320 |
| 2011/0283071 A1 | 11/2011 | Yokoya et al. |
| 2012/0047514 A1 | 2/2012 | Seo et al. |
| 2012/0089710 A1 | 4/2012 | Rakowski et al. |
| 2012/0102500 A1 | 4/2012 | Waddington et al. |
| 2012/0204189 A1 | 8/2012 | Eichenberger et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0254266 A1 | 10/2012 | Printezis et al. |
| 2012/0278585 A1 | 11/2012 | Gupta et al. |
| 2012/0284730 A1 | 11/2012 | Decusatis et al. |
| 2012/0297163 A1 | 11/2012 | Breternitz et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |

(56) References Cited

U.S. PATENT DOCUMENTS

| | | |
|---|---|---|
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0298112 A1 | 11/2013 | Gounares et al. |
| 2014/0013132 A1* | 1/2014 | de Rochemont et al. ..... 713/320 |
| 2014/0013306 A1 | 1/2014 | Gounares et al. |
| 2014/0013308 A1 | 1/2014 | Gounares et al. |
| 2014/0013309 A1 | 1/2014 | Gounares |
| 2014/0013311 A1 | 1/2014 | Garrett et al. |
| 2014/0019598 A1 | 1/2014 | Krajec |
| 2014/0019756 A1 | 1/2014 | Krajec |
| 2014/0019879 A1 | 1/2014 | Krajec et al. |
| 2014/0019985 A1 | 1/2014 | Krajec |
| 2014/0025572 A1 | 1/2014 | Krajec |
| 2014/0026142 A1 | 1/2014 | Gounares et al. |
| 2014/0040591 A1 | 2/2014 | Gounares |

OTHER PUBLICATIONS

Daniel Lenoski, James Laudon, Kourosh Gharachorloo, Wolf-Dietrich Weber, Anoop Gupta, John Hennessy, Mark Horowitz, and Monica S. Lam, The Stanford Dash Multiprocessor, Mar. 1992, IEEE.

International Search Authority, International Search Report and Written Opinion, Korean Intellectual Property Office, PCT/US2013/037523, Jul. 31, 2013.

International Search Authority, International Search Report and Written Opinion, Korea Intellectual Property Office, PCT/US2013/041009, Aug. 19, 2013.

International Search Authority, International Search Report and Written Opinion, Korean Intellectual Property Office, PCT/US2013/041178, Aug. 29, 2013.

International Search Authority, International Search Report and Written Opinion, Korean Intellectual Property Office, PCT/US2013/041184, Sep. 27, 2013.

International Search Authority, International Search Report and Written Opinion, Korean Intellectual Property Office, PCT/US2012/066098, Mar. 12, 2013.

International Search Authority, International Search Report and Written Opinion, Korean Intellectual Property Office, PCT/US2012/045964, Jan. 24, 2013.

International Search Authority, International Search Report and Written Opinion, Korean Intellectual Property Office, PCT/US2013/041165, Jul. 1, 2013.

International Search Authority, International Search Report and Written Opinion, Korean Intellectual Property Office, PCT/US2012/066076, Feb. 22, 2013.

International Search Authority, International Search Report and Written Opinion, Korean Intellectual Property Office, PCT/US2012/043811, Jan. 29, 2013.

International Search Authority, International Search Report and Written Opinion, Korean Intellectual Property Office, PCT/US2012/056701, Feb. 27, 2013.

International Search Authority, International Search Report and Written Opinion, Korean Intellectual Property Office, PCT/US2012/056704, Feb. 5, 2013.

International Search Authority, International Search Report and Written Opinion, Korean Intellectual Property Office, PCT/US2012/041036, Jan. 25, 2013.

Kistler, Thomas, "Continuous Program Optimization", PhD Dissertation, University of California, Irvine, 1999.

Kistler, Thomas, "Continuous Program Optimization: A Case Study", ACM Transactions on Programming Languages and Systems, vol. 25, No. 4, Jul. 2003, pp. 500-548.

Tong Li, Dan Baumberger, David A. Koufaty, and Scott Hahn, Efficient Operating System Scheduling for Performance-Asymmetric Multi-Core Architectures, Copyright 2007, ACM.

Yang Wang, Paul Lu, Using Dataflow Information to Improve Inter-Workflow Instance Concurrency, 2005, IEEE.

* cited by examiner

USAGE AWARE NUMA PROCESS SCHEDULING

BACKGROUND

Non-Uniform Memory Access (NUMA) is a computer architecture where computer memory may be allocated to different processors or groups of processors, and where each processor may be able to access some memory locations faster than others. In one embodiment, a device may have processors on four different chips or packages. Each package may have a bank of memory with direct memory access, but processors on one package may still access memory associated with a different package. However, there will be a delay in accessing memory associated with a different package.

SUMMARY

Processes may be assigned to specific processors when memory objects consumed by the processes are located in memory banks closely associated with the processors. When assigning processes to threads operating in a multiple processor NUMA architecture system, an analysis of the memory objects accessed by a process may identify processor or group of processors that may minimize the memory access time of the process. The selection may take into account the connections between memory banks and processors to identify the shortest communication path between the memory objects and the process. The processes may be pre-identified as functional processes that make little or no changes to memory objects other than information passed to or from the processes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
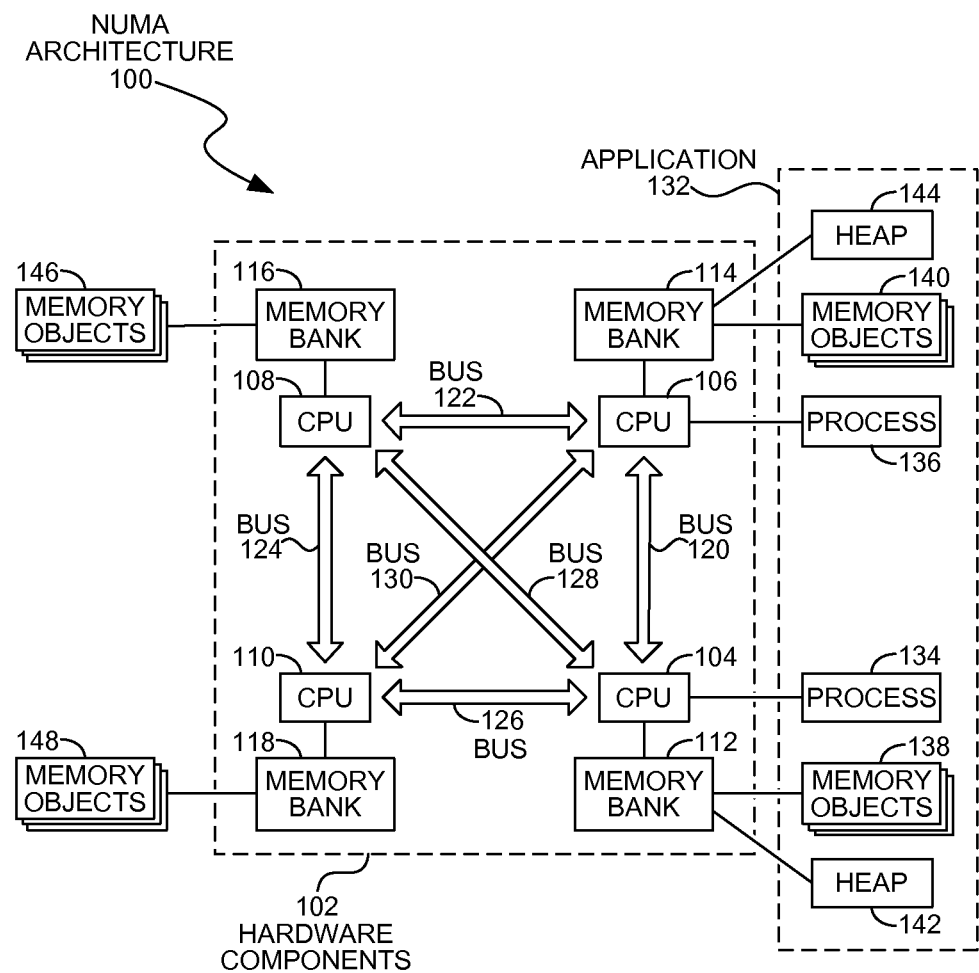
FIG. 1 is a diagram illustration of an embodiment showing a system with Non Uniform Memory Access (NUMA) architecture.

Processes may be placed near existing memory objects in a Non Uniform Memory Access (NUMA) computer architecture. The processes may access memory objects as input objects or output objects. In cases where multiple memory objects are accessed from different locations, an estimate of the memory accesses may identify an optimum location. When an optimum location may not be available, a second or third location may be selected.

Processes may be assigned heap memory within locally accessible memory banks in a multiple processor NUMA architecture system. A process scheduler may deploy a process on a specific processor and may assign the process heap memory from a memory bank associated with the selected processor. The process may be a functional process that may not change state of other memory objects, other than the input or output memory objects defined in the functional process. In other words, a 'functional' process may have a minimum of side effects, where side effects are operations not defined in either input or output data passed to and from the process.

In a NUMA architecture, a computer system may have many processors and several memory banks. In some cases, each processor or group of processors may have a memory bank, such as a server computer which may have, for example, four CPU modules, each having multiple processors or cores. In such an example, each CPU module may have a high speed connection to a memory bank. In general, communication between a processor and its memory bank may be much faster than communication to another memory bank that may be connected to another processor.

A process scheduler may identify a process to launch and may select between many possible processors to have the process executed. The process scheduler may analyze the inputs and outputs of the process to determine the locations of the associated memory objects, then place the process on a processor where the processor may communicate with those memory objects quickly.

The processes may be treated as functional processes during the process scheduling operation. As functional processes, the processes may consume inputs and produce outputs but may not change the state of other memory objects. In some embodiments, the processes may be rigidly defined as functional processes. Such embodiments may include functional programming languages, such as Erlang, Scala, F#, Lisp, Clojure, OCaml, Haskell, and others. In some cases, the processes may be written in a functional programming style where the programmer may adhere to a functional style even though a language, compiler, or other constraint may not enforce the functional style.

When the processes adhere to a functional style or conform to a functional language, the optimized placement of processes near their input or output memory objects may have a larger performance increase than with non-functional processes. As a general observation, non-functional processes may tend to access a larger number of memory objects, as the programmer's tendency in non-functional languages does not focus on defining each input and output to a function.

A programmer in non-functional languages may focus on building relationships and connections between many memory objects through object oriented programming and other paradigms, which often cause a single process to access large numbers of memory objects. In contrast, a programmer of functional languages or in a functional style may focus on operations on a discrete or limited set of memory objects.

Strategic or optimized placement of a process for non-functional languages may not see much performance increase due to the fact that the process may access memory objects from many different memory banks. In contrast, strategic placement of processes for processes from functional languages or in written in a functional style may render large performance gains, as the communication between the processes and memory may be directed to a small set of memory objects, and those memory objects may be in a known location.

The greatest performance gains may be achieved when all of the input and output objects may be located in a single memory bank, although some performance gains may be realized when most of the communication may be with a single memory bank.

The process scheduler may analyze the input and output memory objects for each individual process. In a functional language or in processes defined in a functional style, the input and output memory objects may be easily identified from the process definition. In contrast, identifying the memory objects used by a non-functional language such as an object oriented language may be extremely difficult. As such, the process scheduler may optimize placement of functional language processes much easier than for non-functional languages.

Throughout this specification and claims, the term "memory objects" is used to refer to items stored in memory. In some cases, the memory objects may be static data that may be retrieved by a process or stored by a process. In other cases, the memory objects may be a buffer, queue, or other mechanism that may store data that may be created or consumed by a process, hardware component, or other mechanism.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a computer system that may deploy a Non Uniform Memory Access (NUMA) architecture. Embodiment 100 is a simplified example of a computer architecture illustrating the selection of a processor for a given process.

Embodiment 100 illustrates a simplified example of a NUMA architecture, showing some hardware components 102 and various software components. The hardware components 102 include CPUs 104, 106, 108, and 110. The CPUs may be a single hardware package, such as an integrated circuit. In many embodiments, each CPU may contain many processors.

Each of the CPUs 104, 106, 108, and 110 may have an associated memory bank 112, 114, 116, and 118, respectively. Between the CPUs and the associated memory bank may be a high speed memory bus. This high speed memory bus may allow fast and direct communication between a processor in the CPU package and a memory storage device within the memory bank. In many embodiments, the memory banks may be discrete components, such as integrated circuits that may be mounted on a printed circuit board.

Each of the various CPUs may be connected by a secondary bus that may be represented by the bus 120, 122, 124, 126, 128, and 130. The secondary bus may allow processes on one CPU package to communicate with other processes on other CPU packages as well as other memory banks associated with other CPU packages. For example, a processor executing on CPU 104 may retrieve memory objects 146 on memory bank 116 by communicating across the bus 128 to CPU 108, which may fetch the memory object 146.

As a comparison, communications between a CPU and a memory bank associated with another CPU may be five, ten, or more times as lengthy as a communication between a CPU and its own memory bank. Each NUMA architecture may have different performance characteristics, but the example comparison illustrates that the high performance communication path between a CPU and its associated memory bank may be much faster, sometimes by an order of magnitude or more, than communications to a memory bank associated with another CPU.

Embodiment 100 is merely one example of a NUMA architecture, and roughly represents many server computer architectures. Other examples of NUMA architectures may be found on a single chip. In such an example, multiple processors may be manufactured on a single silicon die and each processor may have memory associated with that processor. All of the various components illustrated in embodiment 100 may thus be implemented in a single integrated circuit. Again, such an embodiment is merely one other example of a NUMA architecture.

An application 132 may be executed on the NUMA architecture. The application 132 may have multiple processes 134 and 136 and may access various memory objects 138, 140, 146, and 148.

In many applications, concurrent executing threads may be spawned on one or more processors. A process scheduler may assign processes to a specific processor for execution as a thread. In some functional programming languages, a single application may have many hundreds, thousands, or even millions of independent processes that may be executed. In a typical computer system, multiple applications may be executing in parallel.

A process scheduler may determine which processor or groups of processors to place a specific process.

For example, CPU 104 may have four processors on a single CPU package. In such an example, a process scheduler may assign process 134 to any processor within the CPU 104 package. For the CPU 104 package, a process scheduler may maintain a queue of processes to execute, and any available processor may pull from the queue as the processor becomes available. In an example of a specific assignment, a process scheduler may assign a process 134 to core 3 on CPU 104.

A process scheduler may examine the process to be performed to determine which memory objects may be accessed by the process. The memory objects may be consumed as input objects or produced as output objects from the process.

The memory objects may be defined in the executable code. In some embodiments, a process scheduler may receive executable code with metadata that includes memory objects accessed by the process. In one example of such an embodiment, a process scheduler may operate with a just in time compiler that may be capable of identifying memory objects from intermediate code for an application.

The process scheduler may determine the location of the memory objects consumed or produced by a given process and may locate the process as close to the memory objects as possible. When the process is located as close to the data as possible, the process may execute faster.

An ideal solution may be to place a process in a location that minimizes the overhead of accessing memory objects, both at input and output of the process. In many cases, the ideal solution is a location where most of the memory calls may be made over a direct, high speed connection from the processor to a memory bank and to minimize the memory calls to other memory banks. In many cases, a process scheduler may not be capable of accurately determining the number of memory calls. In such cases, various estimates may be made.

A process scheduler may analyze just the input memory objects in several different scenarios. The process scheduler may determine the physical location of the input memory objects and attempt to locate the process on a processor near the memory objects. In one scenario, the output memory objects may not be created. In such a scenario, the output memory objects may be created in the local memory bank for the processor. In another scenario, the number of calls or the size of data transmitted to the output memory objects may not be known prior to execution.

When there may be memory objects located in multiple memory banks, the process scheduler may place the process near the largest number of memory objects. In such an embodiment, the number of memory objects may serve as an estimate for the communication between the process and memory banks.

In another embodiment, the size of the memory objects may be used as a factor in placing processes. In one such example, the combined size of the memory objects in each memory bank may be analyzed and ranked. The memory bank with the largest amount of data consumed or produced by the process may indicate where to place the process. In such an embodiment, the data size may serve as an estimate for the communication between the process and memory banks.

In some cases, the size of the data may not be known. For example, a process may retrieve data from a memory object that is continually being updated. One example of such a memory object may be a buffer from another process, a network interface, or some other source.

Heap memory may be allocated to the process after determining which processor or group of processors may execute the process. Heap memory may be memory that is used by a process during execution, but may be repurposed once the process has completed. In many instances, heap memory may be temporary storage for data used during execution, but the data may not be saved once the process terminates.

Heap memory 142 may be assigned to process 134. Similarly, heap memory 144 may be assigned to process 136. In many cases, a process may access heap memory many more times and more frequently than input or output memory objects. In such cases, assigning heap memory in a memory bank close to the processor may increase performance dramatically from cases where heap memory may be assigned from remote memory banks.

Figure 2:
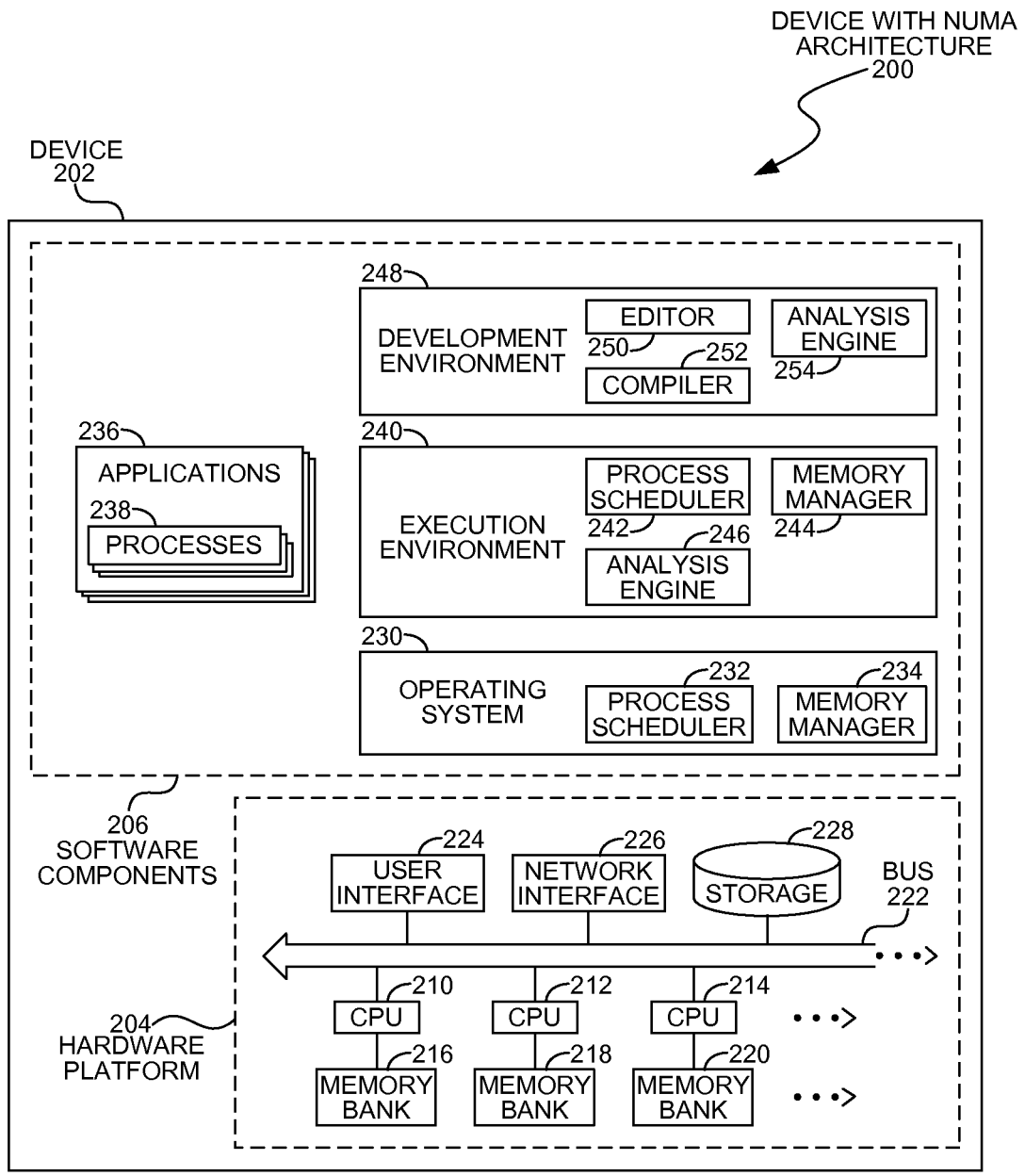
FIG. 2 is a diagram illustration of an embodiment showing a device with NUMA architecture.

FIG. 2 is a diagram of an embodiment 200 showing a computer system that may deploy a Non Uniform Memory Access (NUMA) architecture along with several software components that may place processed in the architecture in an optimized manner.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may be a NUMA architecture that has multiple CPUs 210, 212, and 214 and multiple memory banks 216, 218, and 220. Each of the memory banks is associated with one of the CPUs. Each CPU 210, 212, and 214 may represent a single processor or groups of multiple processors, depending on the system design.

The CPUs may be connected to a bus 222, as well as user interfaces 224, network interfaces 226, and nonvolatile storage 228.

The nonvolatile storage 228 may be storage that persists after the device 102 is shut down. The nonvolatile storage 228 may be any type of storage device, including hard disk, solid state memory devices, magnetic tape, optical storage, or other type of storage. The nonvolatile storage 228 may be read only or read/write capable.

The user interface 224 may be any type of hardware capable of displaying output and receiving input from a user.

In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 226 may be any type of connection to another computer. In many embodiments, the network interface 226 may be a wired Ethernet connection. Other embodiments may include wired or wireless connections over various communication protocols.

The software components 206 may include an operating system 230 on which various applications and services may operate. An operating system may provide an abstraction layer between executing routines and the hardware components 204, and may include various routines and functions that communicate directly with various hardware components.

The operating system 230 may include a process scheduler 232 and a memory manager 234, as well as other components. The operating system 230 may be an environment in which applications 236 may be executed. Each of the applications 236 may contain multiple processes 238 that may be executed independently.

The process scheduler 232 may cause the various processes 238 to be executed on the hardware platform 204. The process scheduler 232 may determine when a specific process is to be launched and may allocate or provision resources for the process. As part of the allocation, the process scheduler 232 may determine which processor or group of processors may execute a process.

A memory manager 234 may manage memory objects for the applications, and perform various functions such as garbage collection, heap management, and the like. The memory manager 234 may allocate heap memory, and may also allocate heap memory to a given process by selecting the memory bank associated with a processor executing the process.

An execution environment 240 may be used in some embodiments to manage execution of the applications 236. The execution environment 240 may include a process scheduler 242 and memory manager 244. In some cases, the execution environment 240 may include a just in time compiler, garbage collection, and other components. The execution environment 240 may be deployed as a virtual machine or other construct that performs low level management of applications.

In some embodiments, an execution environment 240 may be allocated memory and processing bandwidth from an operating system 230 and the execution environment 240 may manage those resources to execute applications. In such an embodiment, the execution environment 240 may be allocated certain processors within the group of CPUs 210, 212, and 214, as well as memory within the corresponding memory banks 216, 218, and 220.

The process scheduler 242 within the execution environment 240 may determine which of the processors or groups of processors may execute each process. The memory manager 244 within the execution environment 240 may manage the various memory objects associated with the application, and may allocate heap memory to each of the processes.

An analysis engine 246 may analyze executable code to identify the memory objects that a process may use. In some embodiments, the analysis engine 246 may identify blocks of executable code that are functional blocks in which only the input and output memory objects may be changed during execution. The analysis engine 246 may analyze the executable code itself, metadata associated with the code, or other information. The output of the analysis engine 246 may be used by the process scheduler 242 and memory manager 246 to allocate processes and memory, respectively, during execution of an application. In some cases, the analysis engine 246 may be executed at runtime, while in other cases, the analysis engine 246 may be executed prior to runtime.

A development environment 248 may be a set of tools used by a programmer to create, edit, and deploy an application. The development environment 248 may include an editor 250 and compiler 252, as well as an analysis engine 254. In some embodiments, the compiler 252 or analysis engine 254 may generate metadata that may be used by a process scheduler to manage the execution of an application.

The metadata may include identifying whether or not a specific process is a functional process, as well as identifying the memory objects that may be accessed by each process. These metadata may be used by an operating system process scheduler 232 or an execution environment process scheduler 242 to optimally execute an application.

Figure 3:
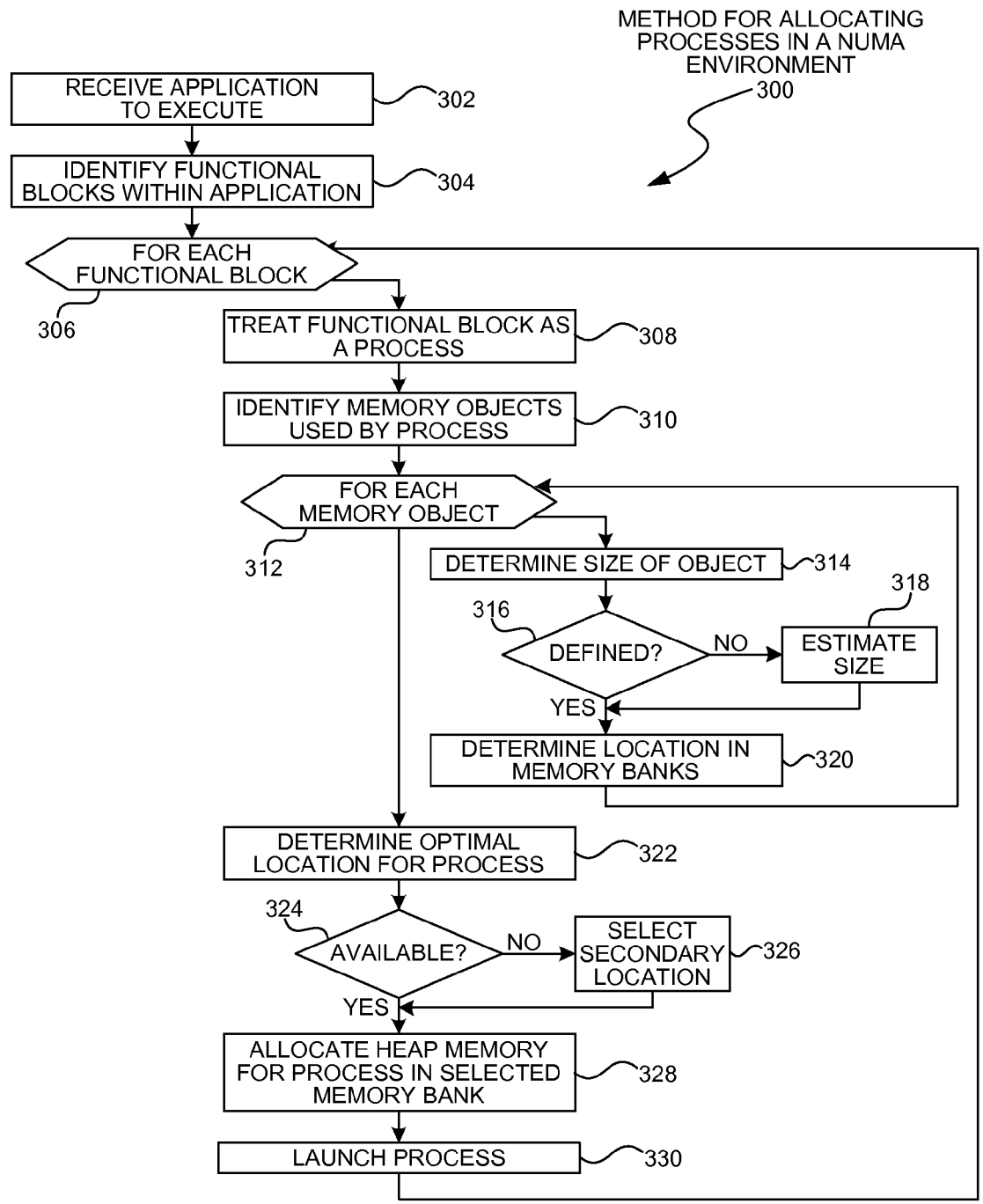
FIG. 3 is a flowchart illustration of an embodiment showing a method for allocating processes in a NUMA environment.

FIG. 3 is a flowchart illustration of an embodiment 300 showing a method for allocating processes in a NUMA environment. Embodiment 300 illustrates one method that may be performed by a process scheduler.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method by which each functional block within an application may be placed on a processor and executed. Embodiment 400, illustrated later in this specification, provides a more detailed method for performing an optimization of the placement.

An application may be received in block 302.

In block 304, the functional blocks within the application may be identified. In some embodiments, an analysis engine may identify each functional blocks. In other embodiments, functional blocks may be defined by a compiler or the functional blocks may be identified in executable code by nature of the language used to describe the code.

In some cases, an application may have blocks of code that are functional blocks and blocks of code that may not comply with the functional programming paradigm. In such cases, portions of an application may be treated as functional blocks and may be placed in an optimized location. The portions of the application that may be considered not functional blocks may be placed using other mechanisms.

Each functional block may be analyzed in block 306. For each functional block in block 306, the functional block may be treated as an independent process in block 308. The designation as an independent process in block 308 may merely mean that the process may have defined inputs and outputs and may not otherwise change the state of other objects.

The memory objects used by the process may be identified in block 310. In some embodiments, metadata associated with the process may contain memory object identifiers and descriptions. In other embodiments, an analysis engine or process scheduler may analyze the executable code to identify the memory objects.

For each memory object in block 312, the size of the object may be determined in block 314. If the size is not defined in block 316, a size may be estimated or a default size assigned in block 318. If the memory object exists, the location of the memory object may be determined in block 320.

After analyzing each memory object, an optimal location for the process may be determined in block 322. Embodiment 400 presented later in this specification illustrates one mechanism for determining an optimal location.

If the optimal location is not available in block 324, a secondary location may be selected in block 326. An optimal location may not be available when a processor or group of processors may be busy or when that processor or group of processors may not have sufficient available memory or other resources for a specific process. There may be other conditions when a certain location may not be available as well.

Heap memory may be allocated in block 328 in a memory bank associated with a target processor or group of processors, and the process may be launched in block 330.

When a process may be launched on a specific processor, the process may be placed in a queue for that processor. When the processor requests work to perform, the processor may pull the process from the queue and may begin execution.

In embodiments where a process may be assigned to a group of processors, each of the processors may have access to a single queue. As any of the processors within the group become open and request work, the processor may pull a process from the queue and begin execution.

Figure 4:
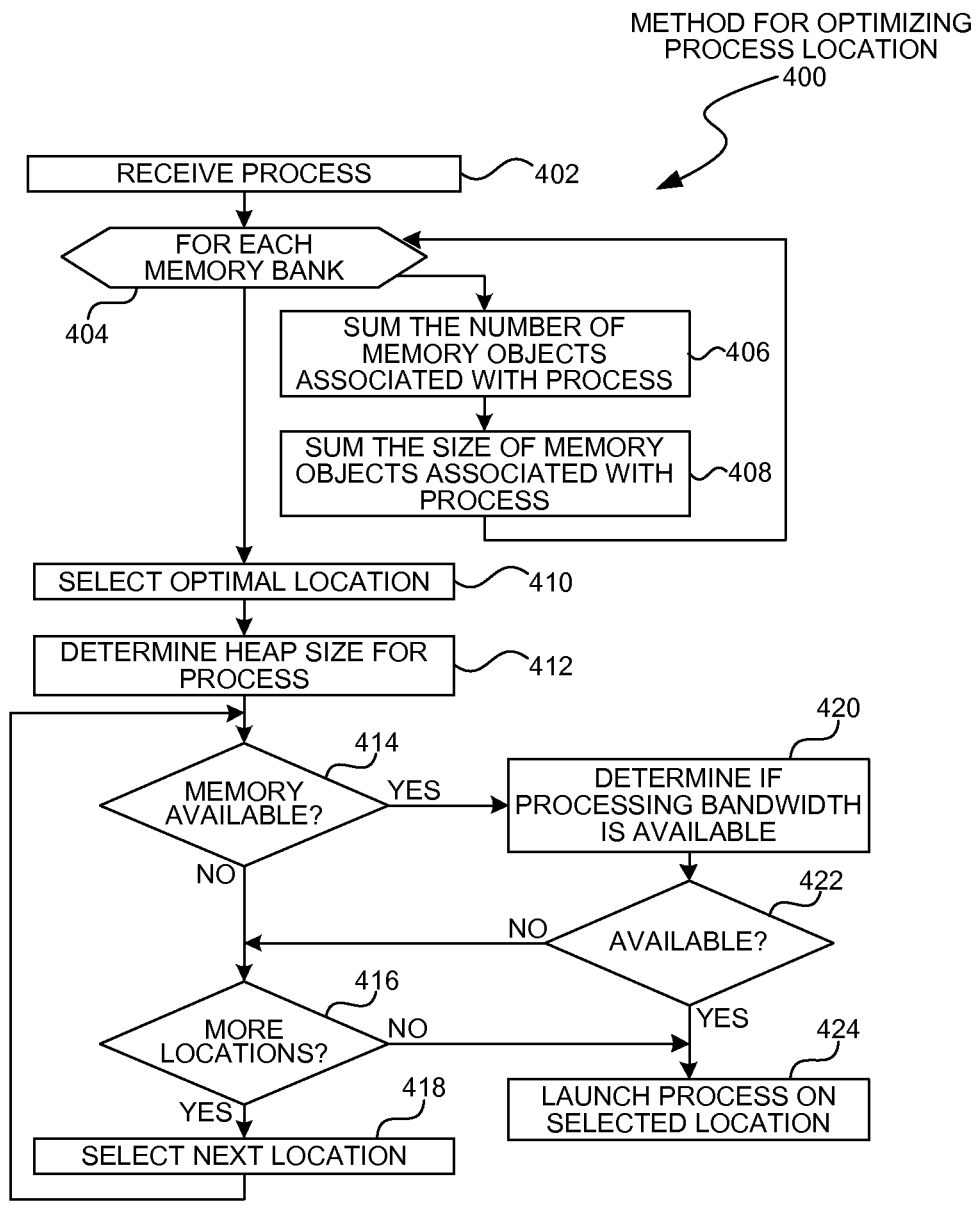
FIG. 4 is a flowchart illustration of an embodiment showing a method for optimizing process location.

FIG. 4 is a flowchart illustration of an embodiment 400 showing a method for optimizing a process location. Embodiment 400 illustrates the operations that may be performed in conjunction with block 322 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates an optimization mechanism that may use either or both of the number of memory objects or the size of the memory objects as factors in determining an optimized location for a given process.

A process may be received in block 402.

Each memory bank may be analyzed in block 404. For each memory bank in block 404, the number of memory objects associated with the process may be identified in block 406. Also, the size of the memory objects associated with the process may be assessed in block 408.

After collecting the number and size of memory objects for each memory bank, an optimized location may be determined at block 410. The optimized location may be selected by using the memory bank having the most memory objects associated with the process, the largest amount of data associated with the process, or some combination of the two. In some embodiments, various heuristics, algorithms, or other mechanisms may be used to select an optimized location.

A heap size for the process may be determined in block 412. In some embodiments, the heap size may be estimated when a heap size may not be estimated from a static analysis of the process.

In the optimal location for the process, a determination may be made in block 414 whether sufficient memory is available for the heap. If there is insufficient memory in block 414, and there are more locations to examine in block 416, the next preferable location may be selected in block 418 and the process may return to block 414.

If there is sufficient memory in block 414, an analysis in block 420 may determine if sufficient processing bandwidth may be available. If the processing bandwidth is not available in block 422, the method may move to block 416 to analyze another location. If the processing bandwidth is available in block 422, the process may be launched in the selected location in block 424.

Figure 5:
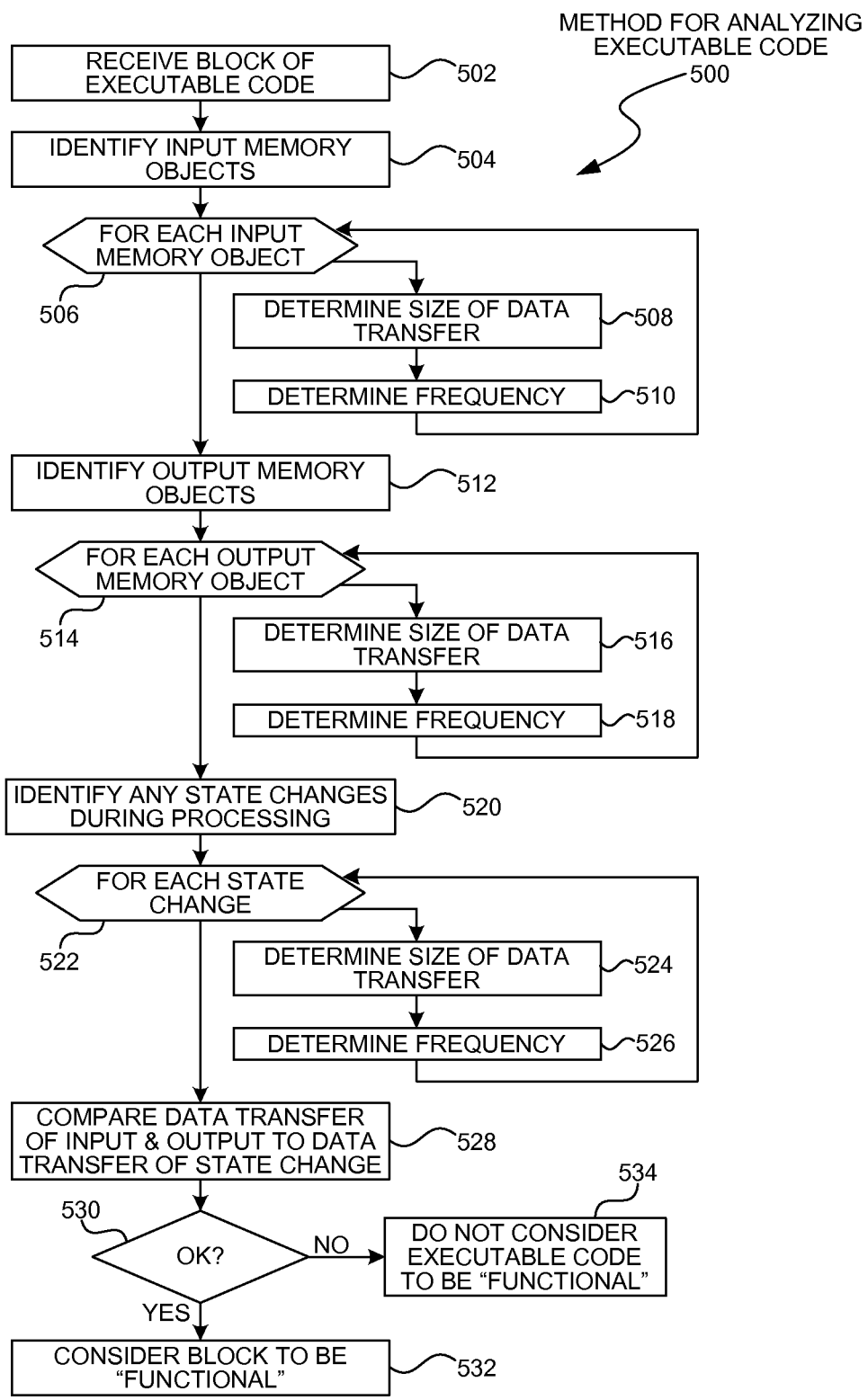
FIG. 5 is a flowchart illustration of an embodiment showing a method for analyzing executable code.

FIG. 5 is a flowchart illustration of an embodiment 500 showing a method for analyzing executable code. Embodiment 500 illustrates one mechanism to evaluate executable code to classify the executable code as either functional code or non-functional code.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a method by which executable code may be classified as functional code or non-functional code. In this context, "functional code" may refer to code written in a functional language style, where a block of code may have defined inputs and outputs, but may have a minimum of side effects during processing. Embodiment 500 examines both the input and output memory objects and compares the input and output memory objects to any side effects that may occur during processing.

When the amount of data transferred through the input and output memory objects is higher than the side effects, the block of executable code may be considered "functional" for the purposes of allocating processes in the NUMA environment. When the block of executable code is considered "non-functional", a process scheduler may treat the executable code as conventional code when placing the processes in a NUMA environment.

In block 502, a portion of executable code may be received.

The analysis of embodiment 500 may be performed prior to executing the code. In some cases, the analysis of embodiment 500 may be performed at compile time by a compiler or prior to execution by an analysis engine. In other cases, embodiment 500 may be performed at runtime by a just in time compiler, an analysis engine in an execution environment, or by an analysis engine in an operating system.

The analysis of embodiment 500 may be performed on any type of executable code. The code may be source code, intermediate code, byte code, machine code, or other code. In some cases, embodiment 500 may be performed on decompiled code.

Embodiment 500 may be performed by analyzing the actual code, by analyzing metadata associated with the code, or by analyzing a combination of actual code and metadata.

In some embodiments, the analysis of the executable code may be performed statically, meaning that the analysis may be performed by analyzing the code prior to execution. In other embodiments, the analysis of the executable code may be performed dynamically. In such embodiments, the code may be instrumented to capture the calls into memory and collect performance information during execution.

In block 504, all input memory objects may be identified. For each input memory object in block 506, a size of data transfer with the object may be defined in block 508 and the frequency of the data transfer may be defined in block 510.

All output memory objects may be identified in block 512. For each output memory object in block 514, a size of data transfer with the object may be defined in block 516 and the frequency of the data transfer may be defined in block 518.

All side effects may be identified in block 520. For each side effect in block 522, a size of data transfer with the side effect may be defined in block 524 and the frequency of the data transfer may be defined in block 526. A side effect may be any operation that may exchange data with another memory object, process, device, or other component, other than the defined input and output memory objects. A side effect may be, for example, communications with a network interface, storage device, or other peripheral, as well as data transferred with other processes not defined in the input and output memory objects.

The data transfer of the combined input and output memory objects may be compared to the data transfer of the side effects in block 528. If the comparison meets predefined criteria in block 530, the executable code may be considered "functional" in block 532. Otherwise, the executable code may be considered "non functional" in block 534.

The criteria in blocks 528 and 530 may vary from one embodiment to another. In an exemplary embodiment, the executable code may be considered "functional" when the amount of data passed to side effects is less than the amount of data passed to the combined input and output memory objects. In other examples, the executable code may be considered "functional" when data passed to the side effects is less than some multiple of the data passed to the combined input and output memory objects. The multiple may be 1, 0.75, 0.5, 0.25, 0.1.

In some embodiments, the criteria in blocks 528 and 530 may compare the amount of data received from input objects to the amount of data passed to the side effects. The comparison may deem the code "functional" when the data passed to the side effects is less than the data passed with the input objects, for example.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a plurality of processors, each of said processors belonging to one of a plurality of processor groups;
   a plurality of memory banks, each of said memory banks being assigned to one of said processor groups;
   said plurality of processors and said plurality of memory banks being comprised in a single device, each of said plurality of processor groups having communication access to each of said plurality of memory banks;
   an analysis engine that:
      receives executable code;
      identifies a functional block within said executable code by determining that said functional block has defined input and output memory objects and changes no other memory objects during execution; and
      transmits said functional block as said first process to said process scheduler; and
   a process scheduler that:
      receives a first process comprising instructions that operate on a first memory object;
      determines a first memory bank for containing said first memory object;
      selects a first processor being contained in a first processor group, said first processor group corresponding to said first memory bank; and
      executes said first process on said first processor.

2. The system of claim 1, said first process being identified as said functional process by a compiler.

3. The system of claim 2, said compiler being a just in time compiler.

4. The system of claim 1 further comprising:
   an operating system;
   an execution environment within said operating system, said execution environment comprising memory management functions for executing code, said process scheduler operating within said execution environment.

5. The system of claim 1, said process scheduler being an operating system level function.

* * * * *